United States Patent Office 3,390,184
Patented June 25, 1968

3,390,184
PRODUCTION OF PRIMARY AMINES
BY AMMONOLYSIS
Philip H. Moss, Ernest L. Yeakey, and George P. Speranza, Austin, Tex., assignors to Jefferson Chemical Company, Inc., Houston, Tex., a corporation of Delaware
No Drawing. Filed June 1, 1965, Ser. No. 460,492
9 Claims. (Cl. 260—585)

ABSTRACT OF THE DISCLOSURE

High molecular weight secondary alcohols are converted with good yield and selectivity to the corresponding primary amines by reaction with ammonia in liquid phase in the presence of a hydrogenation-dehydrogenation catalyst.

---

This invention is concerned with the preparation of high molecular weight primary amines. More particularly, this invention is concerned with the preparation of high molecular weight primary amines by the reaction of a secondary alcohol with ammonia.

High molecular weight primary amines are useful in the preparation of detergents, bactericides, emulsifiers, plastic and rubber compounding agents, paper and textile modifiers and corrosion inhibitors. In the past, high molecular weight primary amines have been made by the hydrogenation of α-cyanoalkanes. This procedure results in the formation of alpha-primary amines. Primary amines wherein the amino group is attached to a nonterminal carbon atom cannot be obtained in this manner.

The vapor phase reaction of alcohols with ammonia is a well known reaction and is described by M. J. Astle, Industrial Organic Nitrogen Compounds, pages 7–10, Reinhold Publishing Company (1961). This reaction has generally been limited to primary alcohols containing fewer than seven carbon atoms. A mixture of primary, secondary and tertiary amines is obtained. The use of secondary alcohols reportedly results in dehydration of the alcohol with the formation of olefinic by-products.

Russian workers recently reported (Neftekhimiya 1, 555–563 (1961); C.A. 58, 13778–9 (1963)) the reaction of long-chain secondary alcohols with ammonia over a fused iron catalyst to yield primary amines. However, conversions of the alcohols were as low as 53% in one instance and generally were in the range of only 80–90%. Too, substantial amounts of secondary and tertiary amines were formed. Yields of total amines were generally only 80–85%. The presence of primary, secondary and tertiary amines, unreacted alcohol and by-products results in a complex reaction mixture which is difficult to separate. This is particularly true in those cases where a mixture of alcohols is employed.

Contrary to published reports, we have now found that high molecular weight secondary alcohols can be converted to the corresponding primary amines by reaction with ammonia in the liquid phase at a temperature of 175°–300° C. over a catalyst as described hereinbelow. By our process, secondary alcohols are converted in good yields to the corresponding primary amines, and high conversions of the alcohols are obtained.

Alcohols that may be employed in our process are those secondary alcohols having the formula:

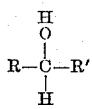

wherein R and R' are linear alkyl groups, each of which contains from 1–19 carbon atoms, and R and R' together contain from 7–20 carbon atoms. Examples of such alcohols include 2-octanol, 2-dodecanol, 2-tetradecanol, 2-octadecanol and mixtures of secondary alcohols obtained by the oxidation of $C_8$–$C_{20}$ linear alkanes. One such mixture containing $C_{12}$–$C_{15}$ secondary alcohols is commercially available. Our process is particularly well suited for conversion of the mixtures of alcohols since little unreacted alcohol is left and high yields of primary amines are obtained. Separation problems are thus minimized. For this reason, plus the availability and relatively low cost of the mixtures of alcohols, such mixtures are preferred starting materials for our process. Oxidation of the alkanes occurs in a random manner so that the product not only contains alcohols of varying chain length, but also alcohols wherein the hydroxyl group is attached at different positions within the carbon chain. The complexity of such a mixture is apparent. If substantial amounts of alcohol remain unconverted the separation of the amine product becomes quite difficult.

The catalysts that we have found to result in high conversion of the alcohol and good yield of primary amine comprise one or more substances selected from the group consisting of nickel, cobalt, copper and their oxides. Nickel and cobalt are the preferred metals. When hydrogen is employed in the reaction the oxides are reduced to metal or a lower oxide during the reaction. In addition to the above substances the catalyst may contain minor amounts of at least one normally nonreducible metal oxide from the group consisting of chromium oxide, molybdenum oxide, manganese oxide and thorium oxide. These nonreducible oxides promote the activity of the catalyst. A particularly preferred catalyst is a nickel-copper-chromia catalyst as described in United States Patent 3,152,998.

Ammonia may be used in either aqueous solution or anhydrous form. A minimum of one mol of ammonia per equivalent of hydroxyl group must be used. Preferably, an excess of ammonia of from about 20 to about 30 mols per equivalent of hydroxyl group is employed. A larger excess may be used, limited only by the economics.

While it is not essential, it is highly preferable to use hydrogen in the reaction. Sufficient hydrogen is used to generate enough pressure to keep the reactants in the liquid state.

The reaction may be conducted at a temperature of 175°–300° C., with the preferred temperature range being from about 225° C. to about 260° C. The pressures employed are such as to keep the reactants in the liquid state. Generally, pressures of up to about 5,000 p.s.i.g. are sufficient. The preferred pressure range is from about 2,000 to about 4,000 p.s.i.g. The reaction may be conducted in either a batch or continuous manner with a continuous process generally resulting in better yields.

Our process will be further illustrated by the following examples.

Example I

A mixture of 260 grams (2.0 mols) of 2-octanol, 136 grams (8.0 mols) of ammonia and 100 grams of a nickel-copper-chromia hydrogenation-dehydrogenation catalyst was placed in a one-liter stirred autoclave and heated at 225° C. under a hydrogen pressure of 3,000 p.s.i.g. After three hours at this temperature, the mixture was cooled and filtered to remove the catalyst. There was obtained 226 grams of crude material which, upon distillation, gave 153 grams of 2-aminooctane, boiling point 161°–170° C. at 740 mm. pressure.

Example II

To 250 grams of a mixture of secondary alcohols containing 12–15 carbon atoms (eq. wt. 205) and commercially available were added 136 grams of ammonia and 100 grams of a nickel-copper-chromia hydrogenation-dehydrogenation catalyst in a one-liter stirred autoclave. The mixture was heated to 225° C. under a hydrogen pressure of 3,000 p.s.i.g. and held under these conditions for three hours. After cooling and filtration to remove the catalyst, there remained 196 grams of a clear liquid which, upon distillation, gave 165 grams of a product with a boiling point range of 50°–130° C. at 5 mm. pressure. The mixed amine had an equivalent weight of 219.

Example III

This experiment was carried out in a continuous reactor which comprised an externally heated stainless steel tube 27 inches long with an inside diameter of 1.25 inches and which was packed with 490 ml. of a pelleted nickel-copper-chromia catalyst. Hydrogen (159 l./hr. measured at 0° C. and 1 atmosphere), ammonia (0.67 lb./hr.) and a $C_{12}$–$C_{15}$ linear secondary alcohol mixture as described in Example II (0.39 lb./hr.) were metered into the reactor which was operated at 230°–235° C. and at 3,000 p.s.i.g. pressure. The crude effluent of a run in which 245 grams of secondary alcohol mixture was used was distilled to give 206 grams of a mixture of primary amines, boiling point 75°–150° C. at 4 mm. pressure, and 20 grams of residue. The primary amine mixture had an equivalent weight of 212. Analysis showed only 4.6% of the alcohol was unreacted.

Example IV

Example III was repeated except that the reactor was operated at 240°–245° C. and 3,000 p.s.i.g. pressure. The crude effluent of a run in which 340 grams of linear secondary alcohol mixture was used was distilled to give 286 grams of primary amines, boiling point 75°–150° C. at 4 mm. pressure, and 29 grams of residue. The primary amine mixture had an equivalent weight of 210. Only 2.2% of the alcohol was unreacted.

Example V

Example III was repeated at a temperature of 250°–255° C. From 305 grams of linear secondary alcohol mixture there were obtained 247 grams of primary amines, boiling point 75°–150° C. at 4 mm. pressure, and 30 grams of residue. The primary amine mixture had an equivalent weight of 210. Only 1.0% of the alcohol was unreacted.

Thus, it can be seen that our process results in very high conversions of the secondary alcohol employed with high yields of the corresponding primary amine. High conversion and high yield facilitate the separation of the primary amine from the reaction effluent, particularly when mixed alcohols are used.

Having thus described our invention, we claim:

1. A liquid phase process for the preparation of high molecular weight primary amines which comprises treating a secondary alcohol having the formula:

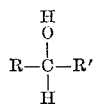

wherein R and R' are linear alkyl groups containing from 1 to 19 carbon atoms and R and R' together contain from 7–20 carbon atoms with at least an equivalent amount of ammonia at a temperature of from about 175° to about 300° C. and under a pressure sufficient to keep the alcohol in the liquid state in the presence of a hydrogenation-dehydrogenation catalyst which comprises at least one member selected from the group consisting of the metals and oxides of nickel and cobalt, together with copper and a metal oxide selected from the group consisting of chromium oxide, molybdenum oxide, manganese oxide and thorium oxide.

2. A method as in claim 1 wherein the hydrogenation-dehydrogenation catalyst is a nickel-containing catalyst.

3. A method as in claim 2 wherein the alcohol is a mixture of secondary alcohols obtained by the oxidation of $C_8$–$C_{20}$ linear alkanes.

4. A method as in claim 2 wherein the catalyst is a nickel-copper-chromia catalyst.

5. A method as in claim 2 wherein the temperature is within the range of about 225° to about 260° C., the pressure is within the range of about 2,000 to about 4,000 p.s.i.g. and about 20 to about 30 mols of ammonia is used per equivalent of hydroxyl group.

6. A method as in claim 1 wherein the catalyst is a cobalt-containing catalyst.

7. A method as in claim 1 wherein the reaction is conducted in the presence of hydrogen.

8. A method as in claim 7 wherein the hydrogenation-dehydrogenation catalyst is a nickel-copper-chromia catalyst, the temperature is within the range of about 225° to about 260° C., the pressure is within the range of about 2,000 to about 4,000 p.s.i.g. and about 20 to about 30 mols of ammonia is used per equivalent of hydroxyl group.

9. A method as in claim 8 wherein the alcohol is a mixture of secondary alcohols obtained by the oxidation of $C_8$–$C_{20}$ linear alkanes.

References Cited
UNITED STATES PATENTS

| | | | |
|---|---|---|---|
| 2,160,058 | 5/1939 | Covert | 260—585 |
| 2,636,902 | 4/1953 | Taylor et al. | 260—585 |

CHARLES B. PARKER, *Primary Examiner.*

R. L. RAYMOND, *Assistant Examiner.*